United States Patent
Parker et al.

(10) Patent No.: US 6,182,971 B1
(45) Date of Patent: Feb. 6, 2001

(54) GAS SEAL FOR PUMPS

(75) Inventors: Joseph C. Parker, Otsego; Christopher D. McCoway, Portage, both of MI (US)

(73) Assignee: Flowserve Management Company, Irving, TX (US)

(*) Notice: Under 35 U.S.C. 154(b), the term of this patent shall be extended for 0 days.

(21) Appl. No.: 09/208,297

(22) Filed: Dec. 9, 1998

(51) Int. Cl.[7] .................................................. F16J 15/34
(52) U.S. Cl. ........................ 277/348; 277/361; 277/369; 277/429
(58) Field of Search .................................. 277/348, 361, 277/369, 374, 429, 423

(56) References Cited

U.S. PATENT DOCUMENTS

| | | |
|---|---|---|
| 2,420,556 | 5/1947 | Mueller . |
| 3,079,605 | 2/1963 | Thomas et al. . |
| 3,333,856 | 8/1967 | Voitik . |
| 3,372,076 | 3/1968 | Wilkinson . |
| 3,475,033 | 10/1969 | Voitik . |
| 3,575,424 | 4/1971 | Taschenberg . |
| 3,805,882 | 4/1974 | Vallance . |
| 3,880,434 | 4/1975 | Echard et al. . |
| 3,988,026 | 10/1976 | Kemp, Jr. . |
| 4,013,297 | 3/1977 | Smith . |
| 4,071,253 | 1/1978 | Heinen et al. . |
| 4,123,069 | 10/1978 | Sato . |
| 4,136,887 | 1/1979 | Wentworth, Jr. . |
| 4,183,541 | 1/1980 | Wentworth, Jr. . |
| 4,365,816 | 12/1982 | Johnson et al. . |
| 4,721,311 | 1/1988 | Kakabaker . |
| 4,749,200 | 6/1988 | Sehnal et al. . |
| 5,149,249 | 9/1992 | Schellong et al. . |
| 5,490,679 | 2/1996 | Borrino et al. . |
| 5,496,047 | 3/1996 | Goldswain et al. . |
| 5,544,897 | 8/1996 | DiPietro et al. . |

FOREIGN PATENT DOCUMENTS 1 586 226  2/1970  (FR) .

*Primary Examiner*—Anthony Knight
*Assistant Examiner*—Enoch Peavey
(74) *Attorney, Agent, or Firm*—Flynn, Thiel, Boutell & Tanis, P.C.

(57) ABSTRACT

A gas seal construction for use on a pump to create a seal between the relatively rotatable pump shaft and housing. A shroud structure is disposed in close surrounding relationship to the shaft axially between the seal and the pump chamber for causing solid particles in the pump liquid to be returned to the pumping chamber.

20 Claims, 3 Drawing Sheets

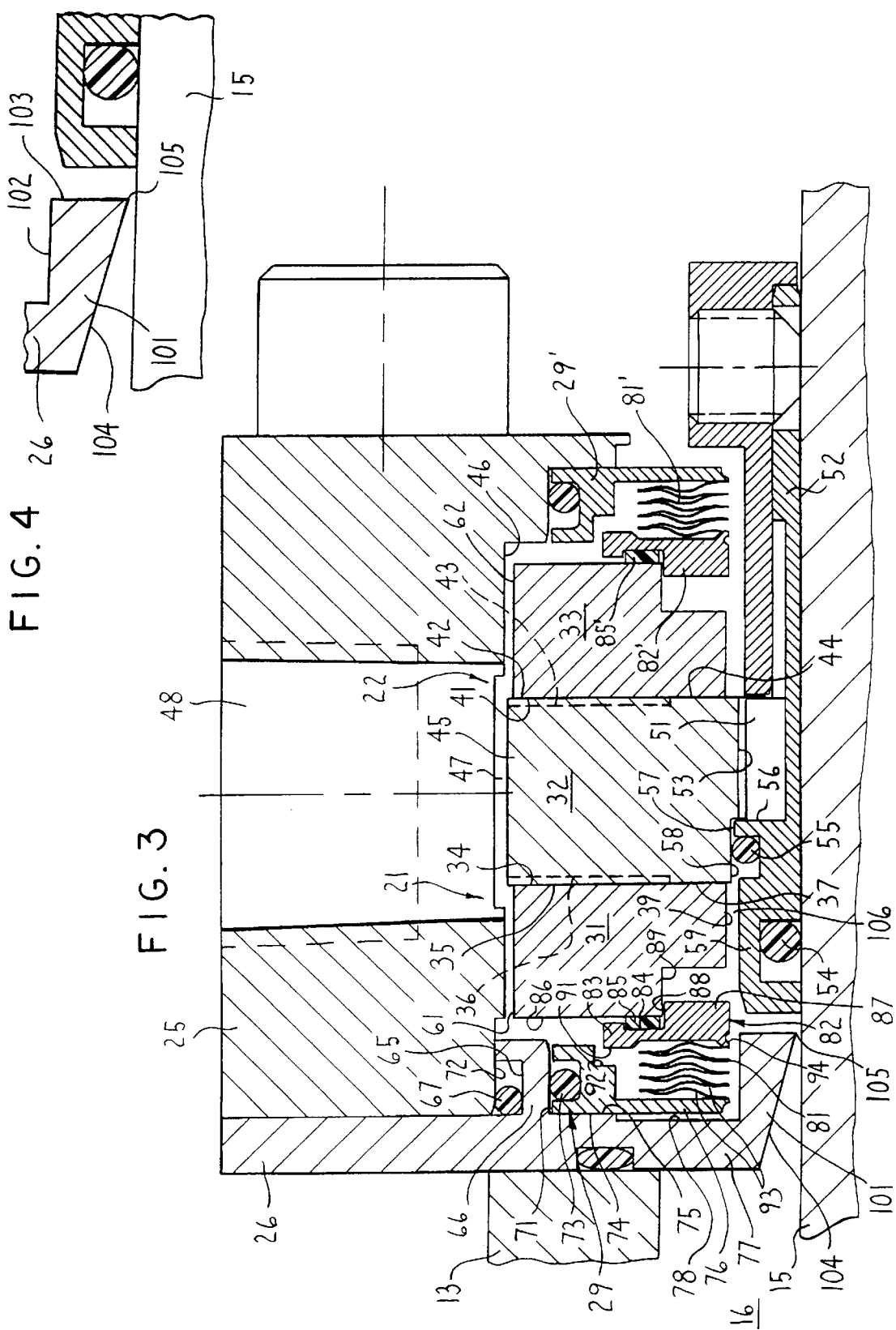

GAS SEAL FOR PUMPS

FIELD OF THE INVENTION

This invention relates to a face-type gas seal which is particularly desirable for use on pumps and, more particularly, to a gas seal which cooperates between a rotatable pump shaft and a pump housing and which incorporates a shroud disposed in close surrounding relationship to the pump shaft generally between the seal and the pumping chamber for minimizing migration of solids in the pumping liquid into the region of the seal faces.

BACKGROUND OF THE INVENTION

Gas seals have been adapted for use on pumps particularly to create a sealed relationship between the rotatable pump shaft and the surrounding pump housing. The gas seal, which may be a single or double unit, typically employs a pressurized barrier gas which is supplied adjacent one periphery of the opposed seal faces (normally the outer diameter), and the opposite periphery of the opposed seal faces (typically the inner diameter) is disposed in communication with the pump fluid. The barrier gas is typically pressurized relative to the pump fluid and, in conjunction with pumping features such as grooves or the like provided on one of the opposed faces, is effective for creating a gas film between the opposed faces to maintain a small separation therebetween, while at the same time preventing the pump fluid from migrating outwardly between the opposed seal faces.

In situations where the pump fluid is a liquid, and even though the liquid is termed cleaned, it has been observed that the liquid nevertheless contains some quantity of small solid particles therein as contaminates. Further, as the technology associated with gas seals and the life of such seals continues to improve, it has been observed that the small quantity of solids contained in "clean" fluids can create a problem with respect to the gas seal. In particular, it is believed that these solid particles tend to become trapped at a fairly high level of concentration in the liquid which gains entry into the seal unit adjacent the inner periphery of the opposed seal faces, and these solids tend to cause erosion or wear of the seal members adjacent the inner periphery of the opposed seal faces.

Accordingly, it is an object of this invention to provide an improvement with respect to the overall seal construction which attempts to at least minimize the aforementioned problem.

More specifically, this invention relates to an improved gas seal construction which is particularly desirable for use on a pump to create a seal between the relatively rotatable pump shaft and housing, and which includes a shroud structure which is disposed in close surrounding relationship to the rotating shaft axially between the seal and the pump chamber, and which is effective for causing many of the solid particles in the pump liquid to be returned to the pumping chamber and thus prevent their entry past the shroud into the region adjacent the opposed seal faces.

In the improved arrangement of the invention, as briefly summarized above, the shroud comprises an annular ring which is fixed to the housing in closely surrounding relationship to the rotatable shaft, and the shroud has an inner cylindrical surface thereon which is of a generally tapered or truncated conical configuration so as to slope outwardly at a small angle relative to the shaft as the shroud projects axially away from the seal-side of the shroud toward the pump chamber. The small diameter end of the shroud, which is disposed adjacent the seal-side, has a diameter which exceeds the shaft diameter by only a small radial clearance so that the rotation of the shaft relative to the closely surrounding shroud, and the rotational effect on the pump liquid, causes the solid particles due to their greater weight to be displaced radially outwardly by centrifugal force so as to move into a position adjacent the inner truncated conical wall of the shroud, with the solid particles then flowing axially along this shroud from the small to the large diameter end thereof, thereby permitting return of many of the solid particles back to the pumping chamber.

Other objects and purposes of the invention will be apparent to persons familiar with arrangements of this general type upon reading the following specification and inspecting the accompanying drawings.

BRIEF DESCRIPTION OF THE DRAWINGS

FIG. 3 is a sectional view similar to FIG. 2 but showing the seal having a shroud associated therewith according to present invention.

FIG. 4 is an enlarged fragmentary view which illustrates only that part of the seal disposed in close association with the shroud.

Figure 1:
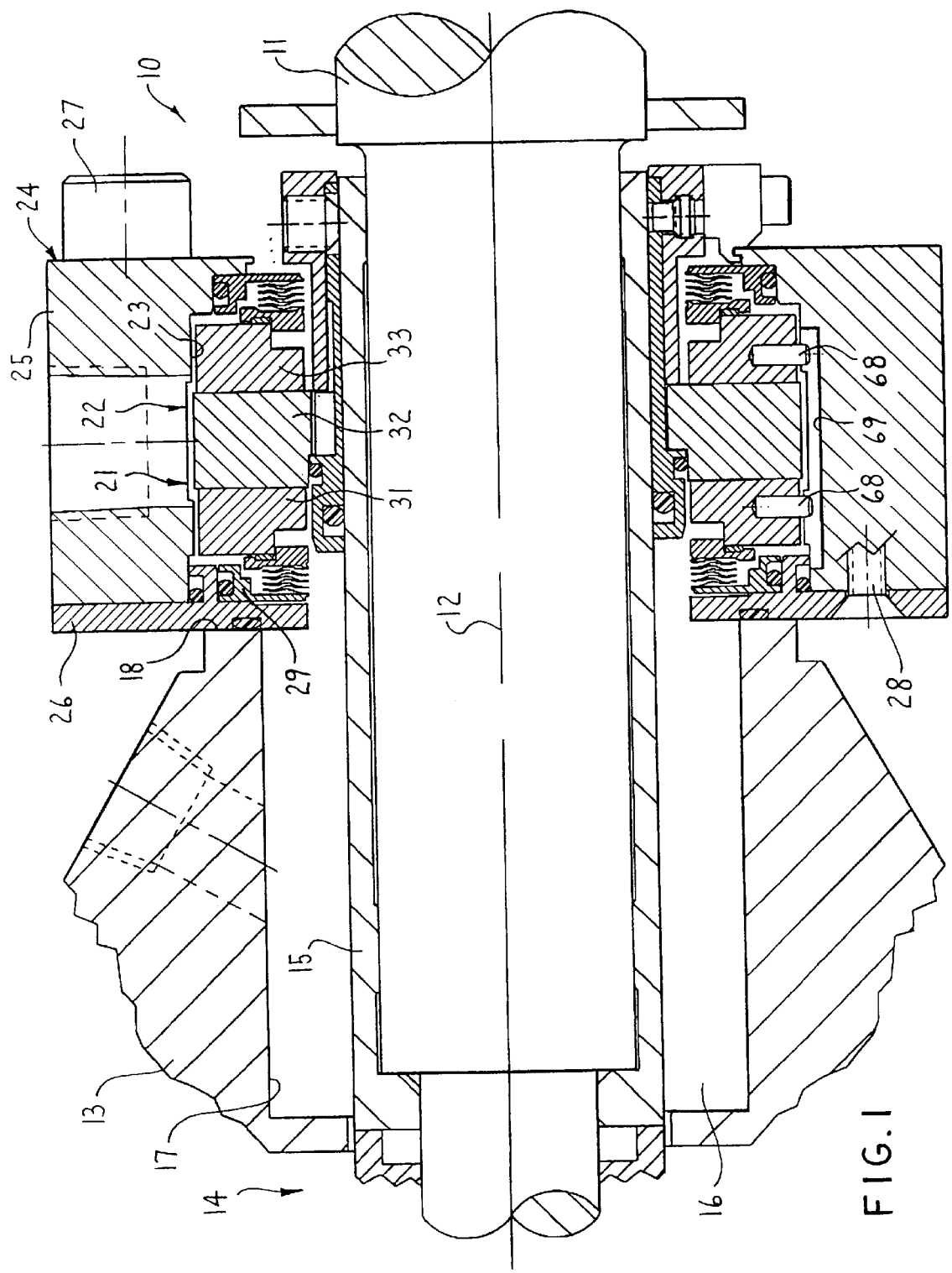
FIG. 1 is a central cross sectional view taken axially through the stuffing box of a pump and showing a double-gas seal therein cooperating with and surrounding a rotatable pump shaft.

Certain terminology will be used in the following description for convenience in reference only, and will not be limiting. For example, the words "upwardly", "downwardly", "rightwardly" and "leftwardly" will refer to directions in the drawings to which reference is made. The words "inward" and "outward", when used in conjunction with the pump, will refer to directions which are respectively inwardly of the stuffing box toward the pumping chamber or outwardly away therefrom. The words "inwardly" and "outwardly" will also refer to directions toward and away from, respectively, the geometric center of the overall seal assembly and designated parts thereof. Said terminology will include the words specifically mentioned, derivatives thereof, and words of similar import.

DETAILED DESCRIPTION

Figure 2:
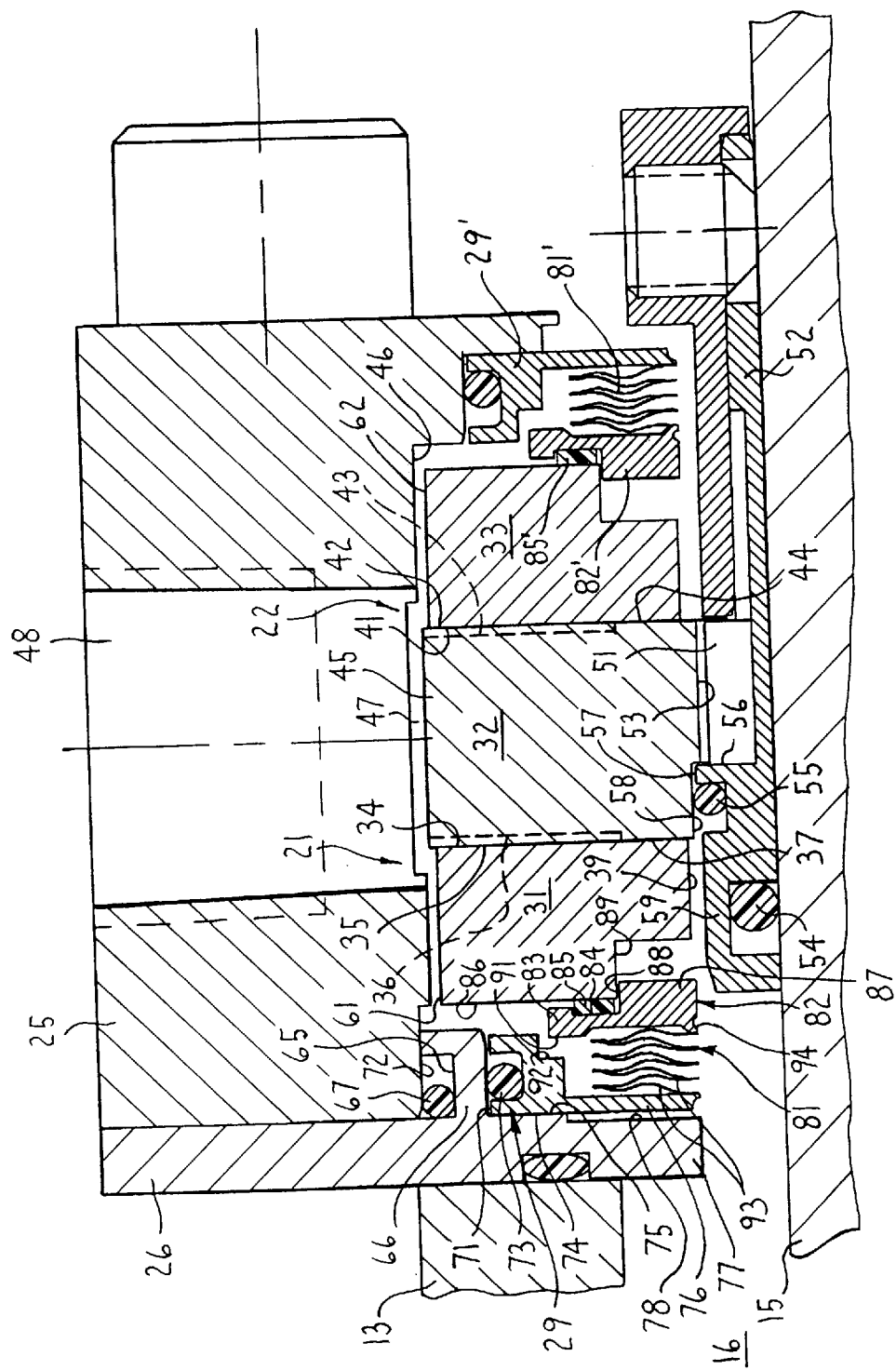
FIG. 2 is an enlarged sectional view showing part of the upper half of the seal arrangement shown in FIG. 1, the seal being shown in its normal operating position.

Referring to the drawings, and specifically FIGS. 1 and 2, there is illustrated a double seal arrangement 10 disposed in surrounding relationship to a shaft 11 which rotates about its axis 12, and which is rotatably supported on and projects outwardly from a housing 13 associated with a fluid handling device such as a pump 14. In the illustrated embodiment, the shaft 11 includes a surrounding shaft sleeve 15 fixed thereto. The housing 13 has a sleeve portion which defines therein an annular stuffing box or chamber 16 as disposed in surrounding relationship to the shaft 11. This stuffing box 16, in the illustrated embodiment, is for a small seal chamber pump, and the stuffing box is defined within an outer annular wall 17 defined by the pump housing. The double seal arrangement 10 in the illustrated embodiment is disposed so as to substantially abut an outer end 18 of the stuffing box housing so as to permit a sealing closure of the outer end of the stuffing box 16.

The double seal arrangement 10 includes axially inboard and outboard seal units 21 and 22, respectively, which are positioned within an annular chamber 23 which is defined generally by a gland structure 24 which is fixed to the pump housing 13 in surrounding relationship to the shaft 11. This gland structure 24 includes a main gland plate 25 which axially abuts an inner gland or retainer plate 26, the latter being sealingly engaged to an end face of the stuffing box housing. Suitable fasteners or screws 27 and 28 are provided for fixedly joining the gland plates 25 and 26 together, and for effecting securement thereof to the pump housing.

The inboard seal unit 21 includes a first annular seal ring (herein also referred to as the "first stator") 31 which rotatably surrounds the shaft 11 and cooperates with an axially adjacent second seal ring (herein also referred to as the "rotor") 32. The first seal ring 31 is nonrotatably secured relative to the surrounding gland plate, and the second seal ring 32 is rotatable due to its nonrotatable securement relative to the shaft. The outboard seal unit 22 is of similar construction in that it includes a third seal ring (herein also referred to as the "second stator") 33 which is nonrotatably secured relative to the gland structure and is disposed axially outwardly of the second seal ring 32. The third seal ring 33 cooperates with the second seal ring 32 to define the outboard seal unit.

More specifically, the inboard seal unit 21 includes flat and substantially planar ringlike seal faces 34 and 35 which are respectively defined on the seal rings 31 and 32 and are disposed on directly adjacent and axially opposed end faces thereof which extend in substantially perpendicular relation to the axis 12. At least one of these seal faces 34 and 35 is provided with a plurality of shallow grooves 36 formed therein, these grooves being formed in the seal face 35 of the rotating seal ring 32 in the illustrated embodiment. The grooves 36 in the illustrated embodiment project radially inwardly from the outer diameter of the interface between the seal faces 34, 35, with the inner ends of the grooves terminating in radially spaced relationship from the radially inner diameter of the seal face interface so as to define an annular nongrooved dam region 37 adjacent the radially inner end of the interface between the opposed seal faces 34 and 35. The grooves 36 are disposed in circumferentially spaced relation around the respective seal face, and typically are angled circumferentially as they project radially inwardly, commonly being referred to as spiral or angled grooves.

The outboard seal unit 22 is similarly constructed in that it includes annular ringlike seal faces 41 and 42 which are respectively defined on the seal rings 33 and 32 and are disposed on closely adjacent and directly opposed axial end surfaces thereof. The faces 41 and 42 are formed or configured in a known manner to create a hydrodynamic gas seal therebetween during relative rotation of the seal faces. For example, in the illustrated embodiment, one of the faces 41 and 42, the face 42 in the illustrated embodiment, is provided with shallow grooves 43 which are formed in the seal face in circumferentially spaced relation therearound, with these grooves 43 conventionally angling circumferentially as they project radially inwardly from the outer diameter of the interface between the seal faces 41 and 42. The grooves 43 are also separated from the inner diameter of this seal interface by a nongrooved annular dam 44.

The specific configuration of the seal faces 34–35 and 41–42, and of the grooves and dams associated therewith, is conventional and one example of a known seal face configuration for a gas seal is illustrated by U.S. Pat. No. 5,556,111, as owned by the Assignee hereof.

Other known face patterns, including a wavy face design (i.e., U.S. Pat. No. 4,836,561) can be provided on the faces of the seal rings.

The second seal ring 32 defines thereon an outer annular wall 45 which is of smaller diameter than and is spaced radially inwardly from the stepped inner annular wall 46 of the main gland plate 25, thereby defining an annular chamber 47 therebetween to which is supplied a pressured barrier fluid, normally a pressurized inert gas such as nitrogen. The main gland plate 25 has a supply port 48 associated therewith for communication with the barrier chamber 47, which supply port in turn connects to a suitable exterior system (not shown) for supplying pressurized gas to the barrier chamber. The arrangement for supplying a pressurized barrier gas to the barrier chamber is conventional, and further description thereof is believed unnecessary.

As illustrated by FIG. 2, the barrier chamber 47 is sufficiently axially elongated so as to extend axially over and in surrounding relation to the seal rings 31 and 33, whereby the barrier chamber thus communicates with the radially outer ends of the seal interfaces defined between the opposed seal faces 34–35 and 41–42. The barrier gas supplied to the barrier chamber 47 thus continuously communicates with the outer ends of the grooves 36 and 43 to permit creation of a gas seal between the opposed seal faces in a conventional manner.

To nonrotatably secure the seal ring or rotor 32 with respect to the shaft 11, the seal ring 32 has an axially extending slot 53 formed in the inner diameter thereof, and this slot accommodates therein a key 51 which is secured to an elongate shaft sleeve 52, the latter in turn being disposed in surrounding relationship to and nonrotatably secured to the shaft 11, such as by a set screw. An O-ring 54 is captivated within a groove formed in the shaft sleeve 52 to create a seal relationship between the shaft sleeve 52 and the shaft 11.

The rotor 32, intermediate the axial ends thereof, and adjacent the inner axial side (the left side in FIG. 2), has a radially inner stepped configuration defined by a annular wall or shoulder 57 which projects radially outwardly from the inner diameter and which in turn joins to an axially extending inner annular wall 58, the latter projecting axially for intersection with the end face 35. The recess or step defined by the walls 57 and 58 accommodates therein a radially raised annular hub 59 as defined on the shaft sleeve 52. This hub 59 defines thereon an inner annular end face 56 which directly axially opposes and abuts the shoulder 57 so as to securely axially position the rotor 32 to prevent axial outward movement thereof. This hub 59 also has an annular surrounding groove which opens radially outwardly and contains therein an elastomeric seal ring (i.e. an O-ring) 55, the latter maintaining a sealing engagement with the annular inner wall 58 of the rotor.

In a preferred embodiment, the diameter of the inner rotor wall 58 substantially corresponds to the diameter of the adjacent inner annular wall 39 of the inner stator 31, particularly the inner diameter of the seal face 34 formed thereon. This prevents imposition of undesired unbalanced axial forces on the rotor 32 by the process fluid.

The stators 31 and 33 respectively have outer annular walls 61 and 62 which are preferably spaced from the stepped inner annular wall 46 of the main gland plate 25.

The inner retainer plate 26 includes thereon an annular flange 66 which projects axially and concentrically into the interior chamber of the main gland plate 25, and this annular flange 66 has a surrounding annular groove 65 in which there is confined an elastomeric seal ring (i.e., an O-ring) 67 which is maintained in sealing engagement with the inner annular wall 46 of the main gland plate 25.

Each of the stators 31 and 33 is nonrotatably secured but axially movable relative to the surrounding gland plate 25. For this purpose each stator 31 and 33 has a key or pin 68 fixed thereto and, in the illustrated embodiment, projecting radially outwardly thereof into an axially elongate slot 69 defined in the inner wall of the gland plate 25 so as to permit the stators to move axially relative to the gland plate.

The gland structure 24 also mounts thereon a backing member formed as an axially slidable annular pressure piston or pusher 29. In the illustrated embodiment of FIG. 2, this pusher 29 is of a generally H-shaped configuration when viewed in axial cross section, and includes a radially outer annular wall 71 which is concentrically and axially slidably supported on a radially inner annular wall 72 defined on the annular flange 66. The annular wall 71 has an annular groove formed therein for captivating an elastomeric seal ring (i.e. an O-ring) 73, the latter being maintained in sliding but sealing engagement with the opposed annular wall 72. The pusher 29 also has a generally radially inwardly extending rear wall 74 which is disposed in opposed relation to a front wall 75 formed on the retainer plate 26. Under normal seal conditions, this rear wall 74 abuts the front wall 75 as shown in FIG. 2.

The pusher 29 also has an inner annular plate portion 76 which projects radially inwardly from the outer annular part 71, with the rear face of the plate part 76 being coplanar with the rear wall 74. The annular plate part 76 projects radially inwardly to an inner diameter which is similar in magnitude to the inner diameter of the stator 31. The retainer plate 26 also has an inner annular portion 77 which projects radially inwardly substantially coextensively with and, in the illustrated embodiment, somewhat beyond the inner diameter of the plate part 76. The inner annular portion 77 of the gland plate 26 has a forwardly facing recessed wall 78 which is spaced rearwardly at least a small distance from the rear wall 74, even when the latter abuts the front wall 75 as shown in FIG. 2, to provide a clearance space between the opposed but spaced surfaces 74 and 78 for access by the pressurized process fluid.

The inboard seal unit 21 also includes an annular bellows 81 which is disposed in surrounding relationship to the shaft and which cooperates between the inner stator 31 and the gland structure, specifically the pusher 29, to define a seal therebetween which creates an isolation between the process fluid and the barrier fluid, and which also resiliently urges the first stator 31 axially outwardly (rightwardly in FIG. 2) toward the rotor 32.

The bellows 81 has one axial end thereof engaged with a rear end of a seal support member 82. The other axial end of the bellows 81 is engaged against a front end of the pusher 29.

The seal support member 82 is formed as a ring-shaped member having a radially outer portion 83 which, in the axially outwardly directed upper face thereof, is formed with an axially inwardly opening annular groove 84. This groove confines therein an annular seal ring or gasket 85 constructed of a suitable deformable sealing material, such as a material known as Kalrez. The seal ring or gasket 85 projects axially beyond the upper front face of the support ring portion 83 and provides an outer face adapted to be compressed into sealing engagement with a rear face 86 of the stator 31. The annular contact region between the gasket 85 and the rear face of the stator 31 is disposed approximately centrally between the radially inner and outer diameters of the stator and is positioned relative to the opposed seal faces 34 and 35 so as to provide the desired balance of pressures on the rotor due to the pressures imposed thereon by the barrier and process fluids.

The seal support member 82 also has a radially inner annular portion 87 which defines thereon an outer annular surface 88 which substantially defines the radially inner boundary of the groove 84 and which projects axially outwardly a substantial distance beyond the gasket 85. This radially inner annular portion 87 projects axially into an annular step which is formed in the rear inner corner of the stator 31, which step is defined by an inner annular wall 89 on the stator, the latter being disposed substantially in axial slidable engagement with the annular surface 88 defined on the support member 82. Due to this engagement between the surfaces 88 and 89, the support member 82 effectively supports and centers the stator 31 while enabling it to be urged axially toward the rotor 32.

The radially outer portion 83 of support member 82 also has a rearwardly-facing annular face 91 formed thereon, the latter being defined generally within a radial plane. This latter face 91 is normally spaced a predetermined distance from an axially opposed annular face 92 which also extends radially and is defined on the front face of the pusher 29. The face 92 is adapted to move into abutting engagement with the opposed face 91 in the event of a loss of barrier fluid pressure, as explained hereinafter.

Considering now the construction of the bellows 81, it is formed by a small number of convolutions, preferably between about three and five convolutions, FIG. 1 illustrates the bellows formed of four convolutions. Each convolution is formed by two substantially identical annular bellows plates or leaflets 93 which are each generally of a somewhat truncated conical configuration. The two plates 93 defining each convolution have the radially outer edges disposed in axially abutting relationship and suitably welded together around the entire annular periphery thereof to integrally and sealingly join the two plates. The two plates 93 defining each convolution are themselves imperforate so as to be capable of creating a seal between the regions disposed on opposite sides thereof. In similar fashion, the radially inner edges of the adjacent plates of adjacent convolutions are disposed in axially abutting relation and are suitably welded together around the entire inner annular periphery thereof to integrally and sealingly join the plates of adjacent convolutions together. The radially inner edge of the outermost leaflet is fixedly and sealingly joined, as by welding, around the entire inner periphery thereof to a suitable securing flange 94 which is provided on the rear of the seal support member 82 adjacent the inner diameter thereof. In similar fashion the radially inner edge of the leaflet at the other end of the bellows is fixedly and sealingly secured, as by welding, around the entire periphery thereof to the adjacent face of the pusher plate part 76 in close proximity to the inner diameter of the latter. The resulting bellows 81 is thus axially short and compact, and has opposite ends thereof fixedly and sealingly joined to the pusher 29 and the seal support member 82, whereby these latter rings and their fixed securement to the bellows 81 thus define a cartridge-like bellows unit which can be easily assembled into the seal assembly and which occupies minimal space so as to permit the overall seal assembly to be of compact length. The bellows reacts at the inner end through the pusher 29 onto the stationary retainer plate 26, and the axial resiliency of the bellows is thus exerted outwardly onto the seal support member 82, and is applied axially to the stator 31 solely through the compressible seal ring or gasket 84.

When the bellows 81 is positioned for cooperation within the inboard seal unit substantially as illustrated by FIG. 2, the bellows is disposed so that the outer diameter thereof is similar in magnitude to the diameter of the seal ring or gasket 85, and this thus positions the mean effective diameter of the bellows radially inwardly of the gasket 85 so as to provide for optimum balance of pressures on the seal components.

The construction of the bellows 81 provides the overall bellows with an axial length which is normally somewhat smaller than its radial dimension, as measured between the radially outer and inner diameters, thus providing a very small and compact structure.

Because the inner annular region adjacent the bellows 81 is exposed to the process fluid pressure (i.e., the pump liquid pressure), whereas the outer annular region of the bellows is exposed to the barrier pressure, the balance diameter of the seal (sometimes referred to as the mean effective diameter) with respect to the imposition of barrier and process fluid pressures on the stator 31 is thus defined approximately radially midway between the radially outer and inner diameters of the bellows, which balance diameter for the bellows can be accurately defined and, when so defined, can be maintained with a high degree of precision in view of the manner in which the bellows is formed and confined within the inboard seal unit 21.

In addition, the bellows 81 and support ring 82 are positioned such that the sealing or contact point with the stator 31, which sealing or contact point occurs at the gasket 85, is positioned so as to be disposed either at or radially inwardly of the centroid of the stator 31 so as to maintain proper convergence of the seal faces 34–35 toward the seal dam 37 therebetween.

Further, the inner diameter of the gasket 85 is preferably located at or radially outwardly of the mean effective diameter (MED or approximately mid-span) of the bellows 81 for proper sealing.

The outboard seal unit 22 is, in the illustrated and preferred embodiment, constructed substantially identically to the inboard seal unit 21. The outboard seal unit 22 includes a bellows unit which cooperates between the main gland plate 25 and the outboard stator 33. The construction of this latter bellows unit and its cooperation is substantially the same as the inboard bellows unit, and hence parts of the outboard bellows unit are designated by the same reference numerals used to designate corresponding parts of the inboard bellows unit but with addition of a prime (') thereto. Further description of the outboard bellows unit is thus believed unnecessary.

In the construction of the seal arrangement and particularly when the seal is in the normal operating condition of FIG. 2 wherein the pusher 29 abuts against the retainer plate 26, the support ring 82 and pusher 29 have opposed and axially aligned end faces 91 and 92 which are axially spaced by a relatively small distance. This axial spacing between the opposed and aligned annular end faces 91 and 92 represents the minimal axial spacing between the support ring 82 and pusher 29 when in this normal seal condition, and this axial spacing is also significantly less than the axial extent of the bellows 81 which extends between the opposed parts 76 and 87. The spacing between faces 91 and 92 is also less than the spacing between pusher 29 and the rear face of the stator 31. Accordingly, in the event of a loss of barrier fluid pressure in the chamber 47, then the pressure of the process fluid acting on the rear face of the pusher 29 slides the pusher 29 axially outwardly until the face 92 contacts the face 91 on the support ring 82. All of the axially directed process fluid force is then transferred from the pusher 29 through the faces 91–92 to the support ring 82, and thence onto and through the deformable gasket or seal ring 85 for application to the rear face of the stator 31. This process fluid thus acts to increase the sealing engagement which exists at the seal ring or gasket 85 so that the latter is maintained in proper sealed engagement with both the rear face of the stator 31 and the front face of the support ring 82, thereby preventing outward escape of process fluid past the seal ring or gasket. Further, this increased force from the process fluid as imposed on the gasket and as transmitted to the stator 31 is all applied to the stator at a desired and predetermined central location, and is applied through a soft contact region, namely the contact region created by the seal ring or gasket 85, thereby avoiding face-to-face contact between opposed hard faces and significantly minimizing undesired or unacceptable distortion of the stator 31.

Under normal seal operation, the seal arrangement 10 will be disposed substantially as illustrated in FIG. 2. A barrier fluid such as a pressurized inert gas will be supplied to the barrier fluid chamber 47 and hence will flow past the exteriors of the stators 31 and 33 so that the barrier fluid surrounds bellows 81 and 81' and also accesses the grooves 36 and 43 formed in the seal faces defined adjacent opposite ends of the rotor 32. In addition, the process fluid of the pump will normally be present in the stuffing box chamber 16 as well as within the interior annular region defined within the inboard seal unit 21, which process fluid is prevented from escaping due to the seal rings 78 and 85, the bellows 81, and the direct contact between the opposed seal faces 34 and 35, particularly contact at the seal dam 37 when the shaft 11 is stationary or is rotating only at low speed. The pressure of the inert gas supplied to the barrier chamber 47 will typically be higher than the pressure of the process fluid, normally in the range of at least 25 to 50 psi higher. As an example, since the process fluid in small bore pumps typically does not exceed 300 psi, the pressure of the barrier gas may be as high as 350 psi so that the barrier gas pressure will always be higher than the process fluid pressure.

When the pump is in operation and the speed reaches higher rotational limits, the barrier gas is pumped by the rotation of the rotor 32 into the face grooves 36 and 43 to create a hydrodynamic pressure which effectively acts between the opposed seal faces and effects a slight separation between the opposed seal faces, which separation is permitted due to axial movement of the stators 31 and 33 against the urging of the respective bellows 81 and 81'. The inert gas thus effectively creates a seal between the opposed seal faces, such as 34–35, the latter now typically being maintained out of contact with one another, and the higher pressure of the barrier gas is such that if any leakage of fluid occurs radially across the opposed seal faces 34–35, then such leakage is in the form of inert gas in small quantities leaking radially inwardly into the process fluid, whereby leakage of process fluid to the surrounding environment can be effectively prevented. The operation of the gas seal as created between the opposed seal faces is conventional and well known, and further description thereof is believed unnecessary.

During operation of the pump, the bellows 81 is not subject to rotation since it is engaged axially between the nonrotatable pusher 29 and support ring 82, and hence is subject only to limited axial compression due to axial movement of the stator 31 caused by the lift-off thereof from the rotor 32 as explained above. The bellows 81 always exerts an axial biasing force urging the stator 31 toward the rotor 32. The axial biasing force of the bellows 81 is, at all times, applied in its entirety to the stator 31 through the deformable seal ring or gasket 85, thereby providing for a "soft" transfer of force to the stator 31, and at the same time controlling the application of this force to a desired location on the stator. This, in conjunction with the sizing and positioning of the bellows and the gasket, thus permit the pressure balance diameter between the barrier and process fluids to be originally calculated and accurately maintained in operation, whereby the application of forces to the stator 31 by the barrier and process fluids can be desirably balanced in a manner well known in the seal art so as to maintain only the desired pressures thereon so as to not disrupt the desired cooperation between the opposed seal faces 34 and 35.

If during operation the supply of barrier gas to the chamber 47 is interrupted so that the pressure in the barrier chamber 47 is decreased below process fluid pressure, or if the product fluid pressure improperly exceeds the barrier fluid pressure, then the process fluid pressure acting against the rear faces of the pusher 29 will slidably move the pusher axially outwardly from the position illustrated by FIG. 2 so that the face 92 on the pusher directly contacts the opposed rear face 91 of the support ring 82 to increase the sealing pressure at the gasket 85 to prevent escape of process fluid outwardly past the gasket, and to apply a force urging the stator 31 toward the rotor 32 to also effectively maintain a seal therebetween to prevent escape of process fluid.

It will be appreciated that the configuration of the face grooves 36 and 43 as provided on the rotor 32 can assume many variations, and in fact can be of different configurations if desired, depending upon the properties of the gas seal desired. Further, the grooves can be provided on the stators, rather than the rotor, if desired since such is also a known practice.

While the drawings depict a double seal wherein a common rotor is utilized having the seal faces defined on opposite axial sides thereof, it will be appreciated that the single two-sided rotor 32 (FIGS. 1–2) can be replaced by two individual rotors, each having a single seal face thereon for cooperation with its respective stator.

The seal arrangement described above is disclosed in copending U.S. application Ser. No. 08/943 617 filed Oct. 3, 1997, which application is owned by the Assignee hereof, and the disclosure of this latter application is in its entirety incorporated herein by reference.

Referring now to FIG. 3, there is illustrated a seal arrangement which is generally the same as FIGS. 1–2 but which, in addition, is provided with a shroud 101 which is disposed in surrounding relationship to the shaft and is disposed at the axial upstream end of the seal arrangement so as to protect the bellows 81 from the pumping fluid, and to assist in limiting entry of solids from the pumping chamber into the seal chamber, as explained hereinafter.

The shroud 101 is fixed to, here formed integrally with, the radially inner end of the stationary retainer plate 26 and is defined generally as an axially elongate annular member which generally concentrically surrounds the rotational shaft 15 and projects axially inwardly of the seal arrangement so as to project generally concentrically within the interior of the bellows 81. The shroud 101 is thus effectively cantilevered axially away from the retainer plate 26 so as to project within the bellows 81, and is defined by a generally cylindrical outer surface 102 which is of a diameter selected so as to provide clearance with respect to and hence not contact the bellows 81. The shroud 101 is cantilevered axially so as to terminate at a free end 103 which is disposed so that the shroud projects axially under substantially the entire length of the bellows.

The annular shroud 101, on the inside thereof, is defined by a generally cylindrical inner annular surface 104 which in the illustrated and preferred embodiment is of a truncated conical configuration which is of progressively increasing diameter as it projects axially from the free end 103 to the opposite end which, in the illustrated embodiment, is defined at the outer face of the retainer plate 26 which faces the pumping chamber. The inner conical surface 104 is tapered or sloped so as to diverge outwardly away from the axis of the shaft 15 as the surface projects axially toward the pumping chamber, and this slope will preferably be in the range of from about 10° to about 20° relative to the shaft axis, with the preferred angle of slope being about 15°.

In addition, the size of the inner cylindrical surface 104 of the shroud is selected so that only a small annular clearance 105 is defined between the outer surface of the shaft and the minimal diameter of the shroud, which minimal diameter is defined at the apex or free end 103 thereof. This annular clearance 105 is preferably made as small as possible without creating interference with or permitting contact between the shroud and the shaft. The annular clearance 105 preferably is defined by a radial clearance in the range of between about 0.020 and about 0.050 inch, with the radial clearance preferably being in the neighborhood of about 0.025 inch.

With the provision of the tapered shroud 101 in its positional relationship as illustrated by FIG. 3, during normal operation of the pump the shaft 15 rotates causing rotation of the pumping element (not shown) within the pumping chamber, and thus pressurization of the pump liquid, which liquid exists in the chamber 16 and also exists past the shroud 101 in the annular clearance 106 between the shaft sleeve 59 and the opposed inner annular surfaces of the stator 31 and rotor 32, which pressurized liquid is present adjacent the radially inner ends of the opposed seal faces 34 and 37, which pressurized pumping liquid is restricted from further outward flow by the O-ring 55. During rotation of the shaft 15, however, in order for the liquid to move into the annular seal zone 106 defined adjacent the inner diameters of the opposed seal faces, the pump liquid must move through the converging elongate passage defined within the tapered shroud 101, and more specifically must pass through the very narrow annular clearance 105 defined at the apex end thereof. As the liquid moves through this passage towards the clearance 105, the rotational centrifugal effect imposed by the shaft on the liquid causes the solid particles in the liquid to be displaced radially outwardly due to the effects of centrifugal force, particularly in the region of the narrow annular clearance 105, so that the solid particles are forced outwardly to a position directly adjacent the inner tapered surface 104, whereby the continuous flow of the liquid sets up a circulation pattern such that the solid particles then migrate axially outwardly (leftwardly in FIGS. 3 and 4) along the diverging surface 104 until they return to the chamber 16. The rotation of the shaft and the rotational effect it imposes on the pump liquid, specifically in the vicinity of the narrow annular clearance 105, thus effectively causes sufficient outward radial displacement of the solid particles as to prevent or at least severely restrict the number of particles which can successfully pass through the clearance 105 into the sealing zone. This thus significantly minimizes the amount of solid particles which gain access into the seal zone 106 and hence minimizes the erosion or deteriorating effect created by these particles in the region adjacent the inner diameters of the opposed seal faces.

At the same time, the shroud acts as an intermediate barrier between the rotating shaft 15 and the interior of the bellows 81, and thus prevents the solids in the liquid from centrifuging outwardly into the interior of the bellows 81, thereby providing additional protection for the bellows by preventing or at least minimizing the amount of solid particles which can gain access into the bellows and deposit between the bellows plates.

The axial length of the inner surface 104 is preferably in the range of about 10 to 20 times the radial dimension of the annular clearance 105.

Although a particular preferred embodiment of the invention has been disclosed in detail for illustrative purposes, it will be recognized that variations or modifications of the disclosed apparatus, including the rearrangement of parts, lie within the scope of the present invention.

What is claimed is:

1. In a gas seal arrangement for creating a sealing relationship between a shaft rotatable about an axis and a housing structure which substantially concentrically surrounds the shaft, said housing structure forming part of a process fluid handling device and defining a process fluid chamber, said seal arrangement including a retainer plate fixed to said housing structure in surrounding relationship to said shaft, a seal unit disposed within said housing structure in surrounding relationship to the shaft for preventing leakage of process fluid from said process chamber into the surrounding environment, the seal unit including a rotor nonrotatably coupled to the shaft and a stator nonrotatably coupled relative to the housing structure and defining a pair of adjacent and axially opposed seal faces, an annular chamber for a pressurized barrier fluid defined within said housing structure in surrounding relationship to said seal unit, and an annular bellows unit positioned in surrounding relationship to said shaft and extending axially between said stator and said retainer plate for resiliently urging the stator axially toward the rotor, said bellows unit separating said process fluid chamber from said barrier fluid chamber, the improvement comprising an annular shroud disposed within said process fluid chamber in generally concentric and closely adjacent but surrounding relationship to said shaft, said annular shroud being fixed relative to said retainer plate and having an opening extending axially therethrough in surrounding relationship to said shaft, said opening being defined by an inner cylindrical surface which is formed of a generally truncated conical shape having a minimum diameter at one axial end thereof which is disposed closest to said seal unit so that said opening flares outwardly as it projects axially away from the seal unit, the minimum diameter as defined at said one end being slightly larger than the outer diameter of said shaft so as to define a radially-narrow annular clearance space therebetween for communication with the seal unit.

2. An arrangement according to claim 1, wherein the truncated conical shape of the inner surface of the shroud extends at an angle of about 15° relative to the rotational axis of the shaft.

3. An arrangement according to claim 2, wherein the annular clearance space defined between the shaft and the minimum-diameter end of the inner surface of the shroud has a radial clearance of about 0.025 inch.

4. An arrangement according to claim 1, wherein the annular clearance space defined between the shaft and the minimum-diameter end of the inner surface of the shroud has a radial clearance of about 0.025 inch.

5. An arrangement according to claim 1, wherein said shroud is cantilevered axially away from said retainer plate in a direction toward said seal unit, said bellows unit being disposed radially spaced from but in exterior surrounding relationship to said shroud so that said shroud is interposed radially between said shaft and the interior of said bellows unit to minimize the collection in the bellows unit of solid particles which are centrifugally displaced radially outwardly of the process fluid by the rotation of the shaft.

6. An arrangement according to claim 5, wherein the truncated conical shape is elongated at an angle of about 15° relative to the shaft axis.

7. In a liquid handling device, such as a pump, having a housing structure defining therein a pumping chamber, a rotatable shaft projecting through the housing structure into the pumping chamber and having a liquid handling element such as a pumping impeller positioned within the pumping chamber and connected to the shaft for rotation therewith, and a seal arrangement cooperating between the rotatable shaft and the housing structure for preventing leakage of pumping liquid from the pumping chamber into the surrounding environment, the seal arrangement including an annular face-seal unit interposed between the shaft and the housing structure, the face-seal unit including an annular rotor nonrotatably coupled to the shaft and disposed axially adjacent an annular stator which is nonrotatably coupled relative to the housing structure, the stator and rotor having axially adjacent and axially-opposed seal faces which cooperate to define inner and outer peripheral edge regions, one of said edge regions being in communication with the pumping chamber, and a pressurized barrier gas being supplied to an annular chamber which surrounds the other peripheral edge region so as to create an annular gas seal film between the opposed seal faces, the improvement comprising an annular shroud fixed relative to said housing structure and disposed closely adjacent but spaced from said shaft in surrounding relationship therefrom so as to define an axially elongated annular flow passage therebetween, said annular shroud being positioned relative to the shaft axially between said face-seal unit and said pumping chamber, said shroud defining thereon an inner cylindrical surface which is axially elongated and defines the outer boundary of said annular flow passage, said inner cylindrical surface being of a generally truncated conical configuration so as to be of increasing diameter as it extends from a first end thereof which is disposed most closely adjacent the face-seal unit to a second end thereof which is directed toward the pumping chamber, said annular flow passage at the small diameter end of said shroud being spaced outwardly from the rotatable shaft by a small radial clearance so that rotation of the shaft causes solid particles in the pumping liquid to be centrifugally displaced outwardly adjacent the truncated conical configuration of said inner surface and then flow axially outwardly therealong for return to the pumping chamber to minimize the inflow of solid particles to the face-seal unit.

8. A liquid handling device according to claim 7, wherein the truncated conical configuration of the inner surface of the shroud extends at an angle in the range of from about 10° to about 20° relative to the rotational axis of the shaft.

9. A liquid handling device according to claim 7, wherein the small radial clearance is in the range of between about 0.020 and about 0.050 inch.

10. A liquid handling device according to claim 9, wherein the truncated conical configuration of the inner surface of the shroud extends at an angle in the range of from about 10° to about 20° relative to the rotational axis of the shaft.

11. An arrangement according to claim 1, wherein the truncated conical shape of the inner surface of the shroud extends at an angle in the range of from about 10° to about 20° relative to the rotational axis of the shaft.

12. An arrangement according to claim 1, wherein the annular clearance space is in the range of between about 0.020 and about 0.050 inch.

13. An arrangement according to claim 12, wherein the truncated conical shape of the inner surface of the shroud extends at an angle in the range of from about 10° to about 20° relative to the rotational axis of the shaft.

14. An arrangement according to claim 1 wherein said shroud terminates at a first free end positioned axially adjacent said seal unit and a second end spaced axially therefrom and connected to said retainer plate, said truncated conical shape of said inner cylindrical surface extending along the entire axial extent of said shroud between said first and second ends thereof.

15. An arrangement according to claim 5 wherein said shroud projects axially from said retainer plate generally concentrically into an interior of said bellows unit and extends along the entire axial extent thereof to form a barrier between said shaft and said bellows unit for minimizing collection of solid particles therein which are displaced radially outwardly of the process fluid by rotation of said shaft.

16. An arrangement according to claim 15 wherein an axially elongated annular flow passage is defined between the outer diameter of said shaft and said inner cylindrical surface of said shroud with said annular clearance space forming part of said annular flow passage, and wherein upon rotation of said shaft solid particles in the process fluid are displaced centrifugally outwardly onto said truncated conical shape of said inner cylindrical surface and then flow axially therealong in a direction away from said seal unit and into said process fluid chamber.

17. In a fluid handling device having a housing structure defining a process chamber for handling a process fluid, a rotatable shaft projecting into the process chamber and having a fluid handling element positioned within the process chamber and connected to the shaft for rotation therewith, and a seal arrangement cooperating between the rotatable shaft and the housing structure for preventing leakage of process fluid from the process chamber into the surrounding environment, the seal arrangement including an annular face-seal unit interposed between the shaft and the housing structure, the face-seal unit including an annular rotor nonrotatably coupled to the shaft and disposed axially adjacent an annular stator which is nonrotatable relative to the housing structure, the stator and rotor having opposed and axially adjacent seal faces, the improvement comprising a housing member fixed relative to said housing structure and disposed in surrounding relationship to the shaft at an inboard side of said face-seal unit adjacent said process chamber, said housing member being radially spaced from said shaft so as to define an axially extending and annular flow passage therebetween, said housing member defining an inner surface which is axially elongated and defines an outer boundary of said annular flow passage, said inner surface being of a generally tapered configuration and having a minimum diameter portion defined at one end of said housing member adjacent said face-seal unit to minimize migration of debris in the process fluid located within said annular flow passage toward said seal unit during rotation of said shaft.

18. A fluid handling device according to claim 17 wherein said housing member is positioned relative to the shaft axially between said face-seal unit and said process chamber.

19. A fluid handling device according to claim 18 wherein said face-seal unit is an inboard face-seal unit disposed adjacent said process chamber, said seal arrangement including an outboard face-seal unit remote from said process chamber and including a stator which is nonrotatable relative to said housing structure and a rotor nonrotatably coupled to the shaft, said stator and said rotor of said outboard face-seal unit having axially adjacent and opposed seal faces, and an annular chamber for a pressurized barrier fluid is defined within said housing structure in surrounding relation to said inboard and outboard face-seal units, said seal arrangement further including a pair of inboard and outboard bellows structures, said inboard bellows structure being disposed axially between said stator of said inboard face-seal unit and said housing structure for resiliently urging said stator axially toward the respective said rotor, and said outboard bellows structure being disposed axially between said stator of said outboard face-seal unit and said housing structure for resiliently urging said stator axially toward the respective said rotor, said process chamber being defined interiorly of said inboard bellows structure, and said inboard bellows structure separating said process chamber from said barrier chamber.

20. A fluid handling device according to claim 17 wherein said housing structure includes a retainer plate which projects generally radially toward said shaft, said housing member being cantilevered axially away from an inner end of said retainer plate in a direction toward said face-seal unit and terminating in said one end which is a free end and is disposed closely adjacent but radially spaced from said shaft to restrict flow of process fluid toward said face-seal unit.

\* \* \* \* \*

UNITED STATES PATENT AND TRADEMARK OFFICE
CERTIFICATE OF CORRECTION

PATENT NO. : 6,182,971 B1  
DATED : February 6, 2001  
INVENTOR(S) : Joseph C. Parker et al.

Page 1 of 1

It is certified that error appears in the above-identified patent and that said Letters Patent is hereby corrected as shown below:

Title page,
Please change "(75) Inventors: Joseph C. Parker, Otsego;  
Christopher D. McCoway, Portage,  
both of MI (US)"

To

--- (75) Inventors: Joseph C. Parker, Otsego;  
Christopher D. McCowey, Portage,  
both of MI (US) ---.

Signed and Sealed this

Fourteenth Day of August, 2001

*Attest:*

*Attesting Officer*

NICHOLAS P. GODICI  
*Acting Director of the United States Patent and Trademark Office*